Nov. 9, 1926.  
H. P. CORBIN  
POWER LIFT MECHANISM  
Filed Jan. 8, 1923

Inventor:
Henry P. Corbin
by J.C. Shorts  Atty.

Nov. 9, 1926.

H. P. CORBIN 1,606,017

POWER LIFT MECHANISM

Filed Jan. 8, 1923. 5 Sheets-Sheet 4

Inventor:
Henry P. Corbin
by L.C. Shonts Atty.

Patented Nov. 9, 1926.

1,606,017

UNITED STATES PATENT OFFICE.

HENRY P. CORBIN, OF MOLINE, ILLINOIS, ASSIGNOR, BY MESNE ASSIGNMENTS, TO MOLINE IMPLEMENT COMPANY, A CORPORATION OF ILLINOIS.

POWER LIFT MECHANISM.

Application filed January 8, 1923. Serial No. 611,255.

The invention relates to a powerlift mechanism.

It is particularly applicable to a power lift mechanism for use on agricultural implements such as illustrated in the drawings although it is not limited to this particular implement.

Certain types of agricultural implements are raised and lowered by means of crank axles pivoted to the implement so that the axles can be swung back and forth for lifting and lowering purposes. Powerlift mechanisms are sometimes provided, operated by one of the ground wheels on the crank axles, and these mechanisms are set into operation by pulling on a rope, cord, or the like that trips the powerlift, which thereupon moves through a predetermined cycle and automatically stops. A powerlift mechanism of this type is illustrated in the patent to Joseph E. Boda, 1,565,619, December 15, 1925. When one of these powerlift mechanisms is tripped with the implement in raised position, the weight of the implement often lowers it very quickly, thereby forcing the powerlift mechanism through its cycle of movement almost instantaneously. This action may occur so quickly that the tripping mechanism will still be in its tripping position, that is, the implement will have lowered itself and the powerlift mechanism will have moved through its intended cycle before the operator has let loose of the rope. If this occurs, the tripping mechanism is still in position to trip the powerlift through a succeeding cycle, which would raise the implement.

Implements of the type described have a powerlift mechanism on more than one crank axle. It is important that the powerlift mechanisms on all axles be tripped into action simultaneously in order that the implement will be raised and lowered in the proper manner. In combination with this simultaneous action, it must be certain that each powerlift mechanism will move through only one cycle of its movement. If, after moving through one cycle, one of them could, for any reason, move through a succeeding cycle while the other one did not, the implement would be raised on one side and lowered on the other.

An object of the invention is to provide a powerlift mechanism which will move through only a predetermined cycle of operation regardless of the duration of movement of the tripping mechanism that sets it into operation.

A further object is to provide a powerlift mechanism, which, after moving through one cycle of operation, cannot be moved through another cycle until the tripping mechanism has been moved to its original position, that is, the position for stopping the mechanism.

Other objects and advantages of the invention will appear from the specification and drawings.

An embodiment of the invention is shown in the accompanying drawings, in which,

Figure 6 is a perspective of one of the rotatable parts of the powerlift mechanism.

Figure 1:
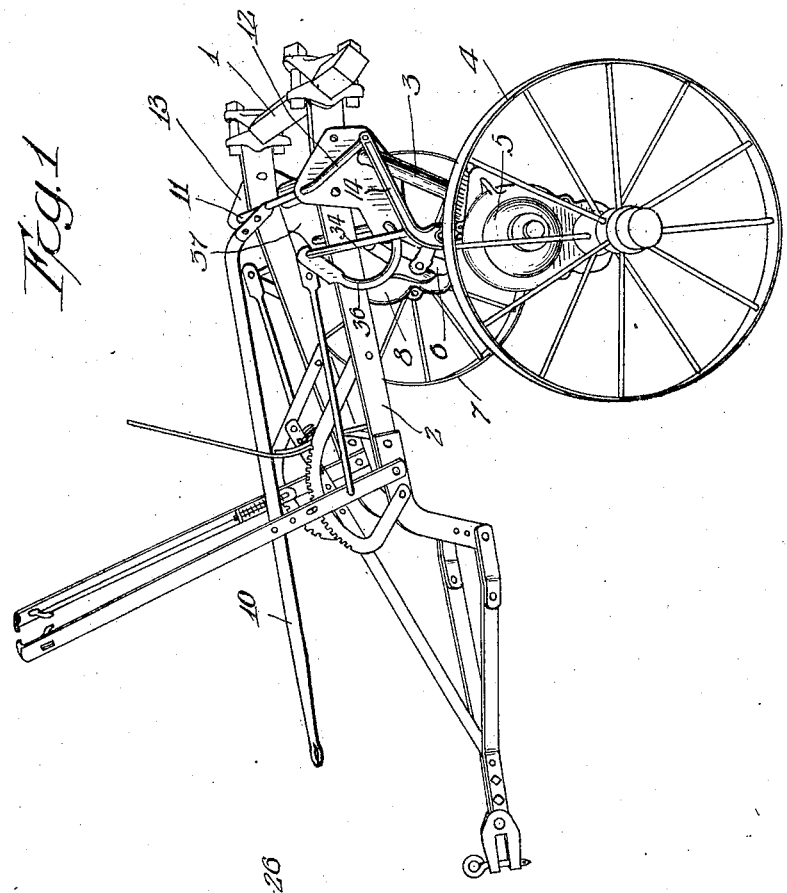
Figure 1 is a perspective view of a universal agricultural implement with the improved mechanism applied thereto.

The universal agricultural implement with which the invention is combined and to which it is applied, comprising, as illustrated in Figure 1, a tool bar 1 to which a variety of agricultural tools may be connected, a draft mechanism 2 connected to the tool bar, a crank axle 3 carrying a land wheel 4 and a powerlift mechanism 5, and a crank axle 6 carrying a land wheel 7 and a powerlift mechanism 8. The two crank axles 3 and 6 are pivoted to the implement so that they may be swung forward and backward for raising and lowering purposes.

It has been found desirable to have a powerlift mechanism on each crank axle of an implement of this type because the strain on one powerlift, if it is to be used to raise both crank axles and the entire implement, is too great if the agricultural tools are connected to the end of the tool bar farthest away from the powerlift. When a powerlift mechanism is provided for each crank axle, it will be evident that it is important to have both mechanisms operate simultaneously in lifting and lowering the implement.

The mechanism for insuring that both powerlifts will be set into operation simultaneously, comprises a rigid lever 10 fixed to a shaft 11, having cranked ends 12 and 13 connected to the tripping levers 14 of the powerlift mechanisms. The lever 10 is in convenient position to be manipulated by an operator seated on a tractor to which the implement may be connected. When the operator raises the lever, as viewed in Figure 1, the shaft 11 will be turned and both of the tripping levers 14 will be positively operated simultaneously and to the same extent. This is a distinct improvement over the old method of using a rope, cord or the like, which always has a certain amount of slack in it and the extent of movement of which to trip the powerlift mechanism is always variable and uncertain. It is particularly difficult to trip two powerlift mechanisms to operation at the same instant by means of a rope. The rigid mechanism herein provided makes it unnecessary for the operator to use any special care. A single movement of the lever 10, which movement is always the same and the extent of which soon becomes familiar to him, insures that the simultaneous tripping action will take place.

In addition to positively simultaneous tripping action, it is important that the powerlift mechanism move through only one cycle of its movement independently of the length of time that the tripping mechanism is held in tripped position. In order to make clear how this action is secured in the present invention, it will be necessary to describe the powerlift mechanism.

Figure 2:
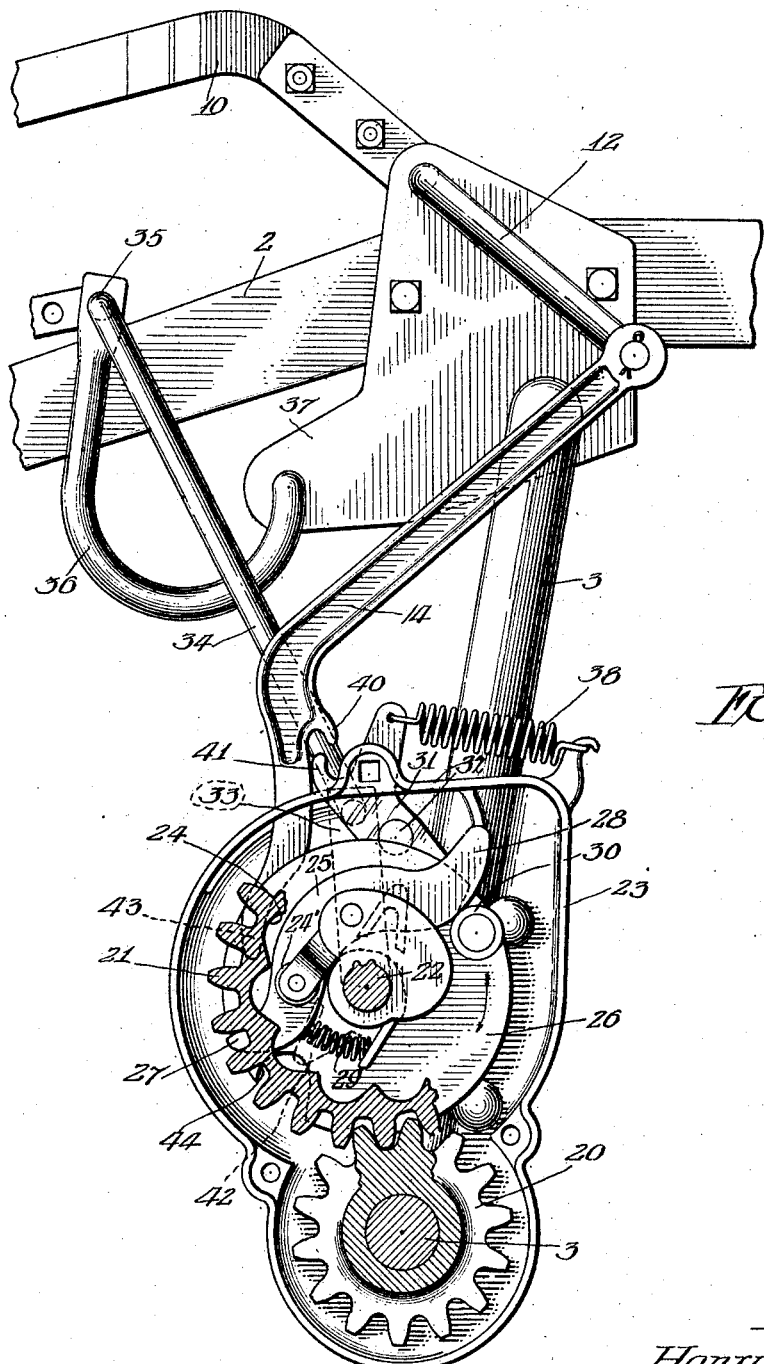
Figure 2 is a side elevation and partial section of the powerlift mechanism and its controlling means showing the parts in the position they occupy when the implement is in raised position, with the powerlift mechanism stationary.
Figure 3:
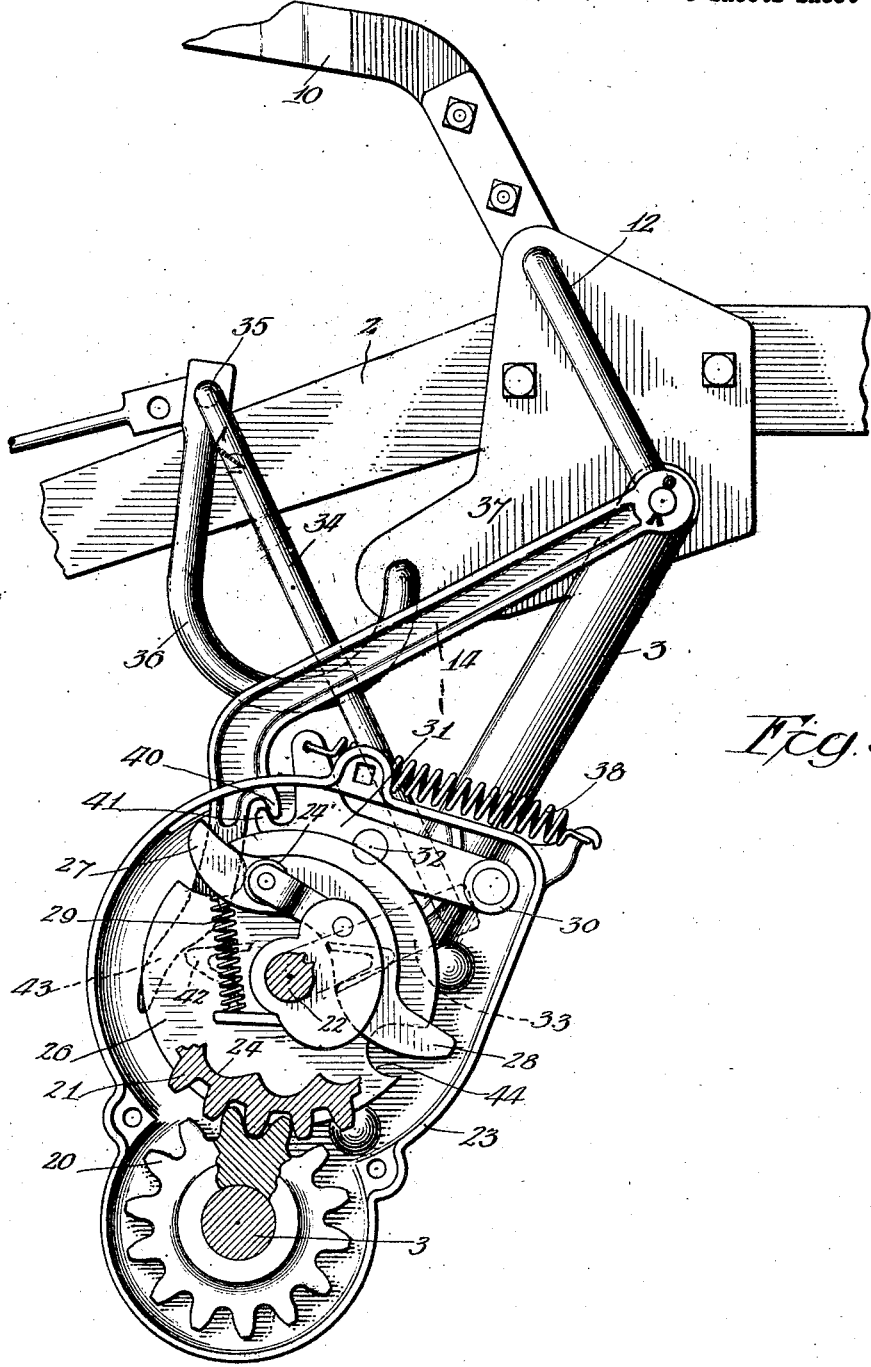
Figure 3 is a view similar to Figure 2, illustrating the position of the parts after the powerlift mechanism has been set into operation and movement started for lowering the implement.

The powerlift mechanism will be understood most clearly by referring to Figures 2 and 3. It includes a gear 20, connected with the hub of the land wheel 4 and continuously rotated thereby. This gear meshes with a second gear 21, loosely mounted on a stub shaft 22 journaled in bearings in the housing 23 which encloses the powerlift mechanism. Both the gears 20 and 21 are continuously rotated with the land wheel.

The interior of the gear 21 is provided with a series of notches 24 with which cooperates a roller 24' carried by a dog 25 mounted on a disk 26 keyed to the shaft 22. The opposite ends 27 and 28 of the dog 25 project beyond the periphery of the disk 26, and the dog is normally biased by a spring 29 in a direction to cause the roller 24' to engage one of the notches 24; but the dog is prevented from moving in this direction by a roller 30 carried by a latch 31 pivoted at the point 32 to the housing 23. Whenever the latch is moved to release the dog, the spring 29 moves it so that the roller 24' engages in one of the notches 24, which action locks the disk 26 with the rotating gear 21, and thereby rotates the stub shaft 22 to which the disk is keyed. The inner end of the stub shaft is provided with a crank 33 pivoted to a link 34, which, in turn, is pivoted at the point 35 to a curved link 36 pivoted to the bearing plate 37 on the implement. When the shaft 22 is rotated, the crank 33 moves from the position illustrated in Figure 2 to that shown in Figure 5, thereby swinging the crank axle from the position of Figure 2 to that of Figure 5. This results in lowering the implement.

The latch 31 is normally held in locking position by a spring 38 of sufficient strength to overcome the action of spring 29 so that the latch will be held in locked position against the action of spring 29. The latch may be tripped from its locked position by means of a tripping lever 14 which has a projection 40 adapted to engage a projection 41 on the latch 31. When the crank 12 of the tripping mechanism is rotated in a clockwise direction, as viewed in Figure 2, the projection 40 engages behind the projection 41 and trips the latch 31 to the position illustrated in Figure 3. When the roller 30 moves from behind the dog 25, the spring 29 biases the dog to such a position that the roller 24' engages one of the notches 24, thereby locking the disk 26 to the rotating gear 21. The powerlift mechanism is thereby set into operation.

Figure 4:
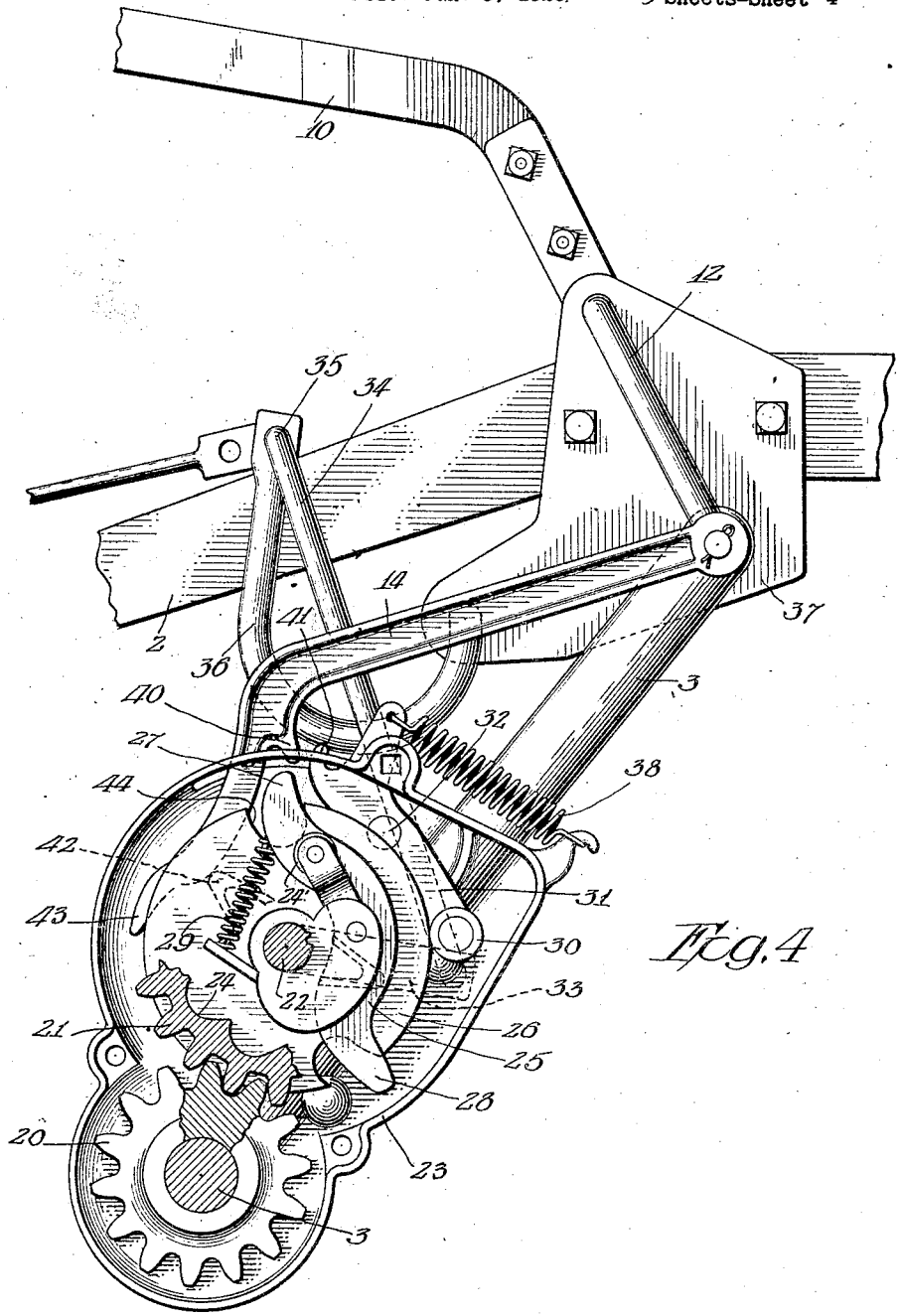
Figure 4 is a view similar to Figure 2, illustrating the position of the parts after the mechanism has moved still further in lowering the implement.

As movement continues, one end of a cam 42 carried by the disk 26 strikes the end 43 of the tripping lever, as illustrated in Figure 4, and disengages the lever from the latch 31. The spring 38 thereupon snaps the latch toward its initial locking position, but it cannot move to its final position because the roller 30 strikes on the periphery of the disk 26 and rides thereon.

As the disk 26 approaches the position where the notch 44 will come under the roller 30, the roller strikes the end 27 of the dog 25, and, since the spring 38 is stronger than the spring 29, the dog is moved in a counterclockwise direction to disengage the roller 24' from the notch 24 with which it may be engaged. As the notch 44 comes directly under the roller 30, the roller snaps into the notch and forces the dog 25 to a completely disengaged position and automatically stops the rotation of the disk 26 and the stub shaft 22.

Figure 5:
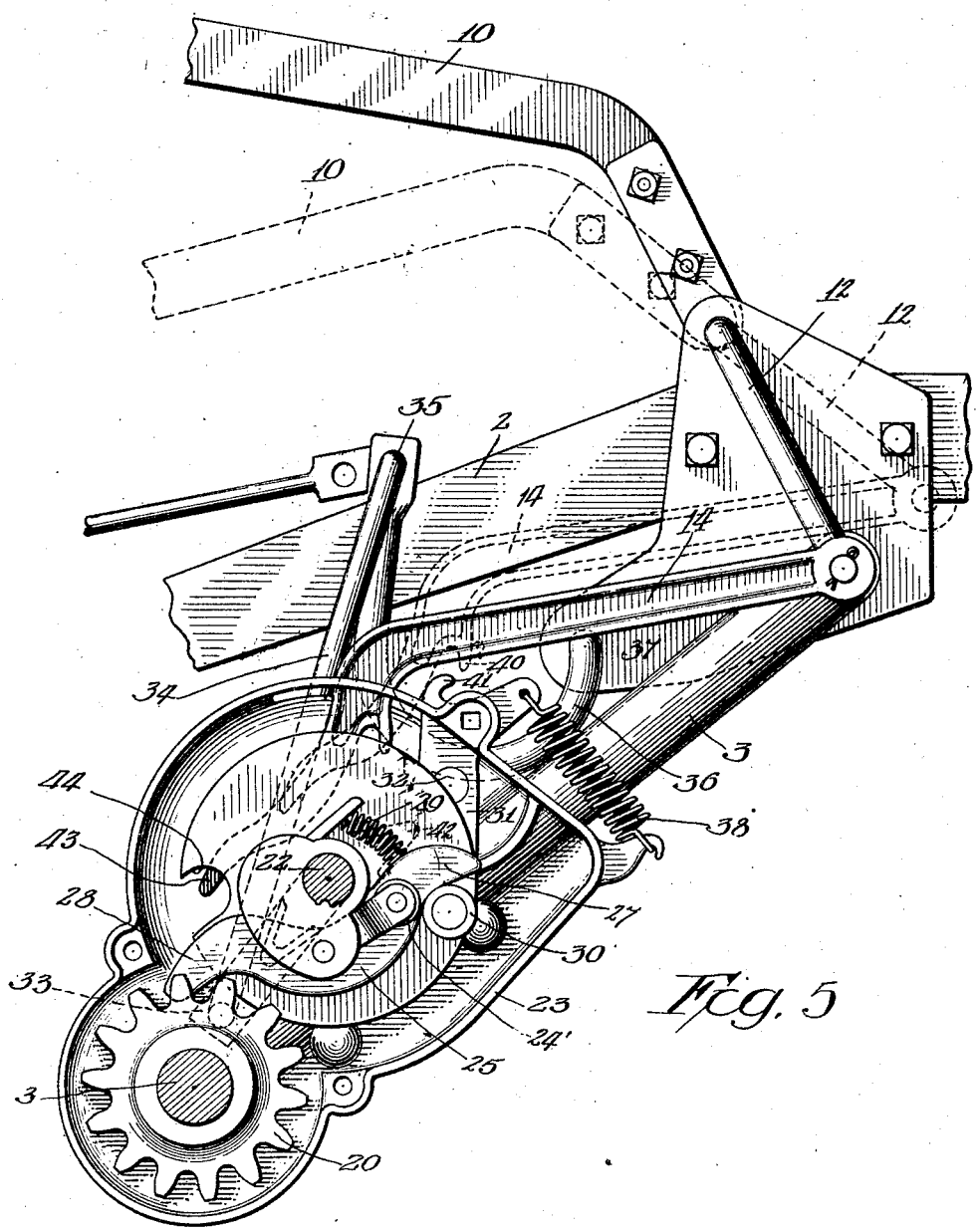
Figure 5 is a view similar to Figure 2 showing in full lines the position of the parts after the implement has been lowered and movement of the mechanism stopped. It illustrates in dotted lines the position of the tripping lever after the latter has been released by the operator.

The position of the tripping lever 14 at the instant the mechanism is stopped, is illustrated in Figure 5 in full lines. It is entirely disconnected from the latch 31, and, consequently, even though the controlling lever 10 is held in its upward position, as illustrated in full lines in Figure 5, the latch is free to automatically stop the mechanism. In other words, even though the powerlift mechanism may move through a complete cycle of operation instantaneously and before the operator has a chance to release the control lever, the mechanism will, nevertheless, be automatically stopped because the tripping latch is disconnected from the tripping lever as soon as the mechanism starts to operate, and the latch functions independently of how long the control lever may be held in tripped position. The intermittently rotatable member serves, through its cam, to disconnect the latch from the control lever and the latch is held in this position by said intermittently rotatable member to thus prevent reconnection with the control lever until the intermittently rotatable member has moved through a cycle and the elements have been disconnected by the movement of the latch into one of the notches in the disk.

In order to cause the powerlift to move through its succeeding cycle of movement, it is necessary to return the control lever to its initial position, as illustrated in dotted lines in Figure 5. It must be moved to this position to cause the tripping lever 14, with its projection 40, to pass the latch 31 with its projection 41. If the tripping lever 14 has not been moved to the dotted line position, it cannot be reconnected to the latch, and, consequently, the mechanism cannot be set into operation. After it has been moved to dotted line position, subsequent movement to tripping position causes a repetition of operation that has been described.

It will thus be clear that a powerlift mechanism has been provided, which, when tripped into operation, will be automatically stopped regardless of the length of time the control mechanism is held in tripping position, and the mechanism cannot then move through a succeeding cycle of movement until the control means is moved to its original position, that is, a position for stopping the powerlift mechanism.

This type of powerlift mechanism applied to each crank axle of an implement of the type described and combined with mechanism for positively insuring that both powerlifts will be tripped at the same instant provides an efficient control for an implement of this character which will operate in the desired manner independently of the manner in which the operator may manipulate the control lever. Whenever the operator moves the control lever to set the mechanisms into operation, they will both be set into operation at the same instant, and they will both automatically stop regardless of whether the operator releases the control lever instantaneously or holds it up in the tripped position for a greater length of time. The only operation that he can perform is to trip both mechanisms at once, after which they will automatically stop independently of what he does.

It is to be understood that the construction shown is for illustration only and that variations may be made in it without departing from the spirit and the scope of the invention as defined by the appending claims.

I claim:

1. The combination with the crank axle of an implement of a powerlift mechanism having an element normally rotated by a ground wheel on the crank axle, an intermittently rotatable element, connecting means for connecting the intermittently rotatable element to the rotatable element and subsequently automatically disconnecting it after it has moved through a predetermined cycle, controlling mechanism normally occupying a position for holding said connecting means in disconnected position but movable to a position to permit the connecting means to connect the elements together, and means operated by movement of the intermittently rotatable element for automatically disabling the controlling mechanism from moving the connecting means to or holding it in connected position after movement of the intermittently rotatable element has started and until said controlling mechanism has been returned to normal position.

2. The combination with the crank axle of an implement of a powerlift mechanism having an element normally rotated by a ground wheel on the crank axle, an intermittently rotatable element, a dog normally urged to a position to connect the elements together, a latch normally urged to a position to hold the dog in retracted position, a tripping lever normally occupying an inactive position but movable to engage the latch to move it to release the dog to permit the latter to connect the elements together, and camming means operated by the intermittently rotatable element for disconnecting the tripping lever from the latch after rotation of the intermittently rotatable element has been started to thereby prevent the lever from holding the latch in position to cause the members to be connected together for more than one cycle.

3. The combination with an implement crank axle of a powerlift mechanism having an element normally rotated by a ground wheel on the crank axle, an intermittently rotatable element, means for connecting said elements together, and controlling mechanism for said means movable to a position to cause said means to connect the elements together, said controlling mechanism including a device movable by the intermittently rotatable element for automatically conditioning the controlling mechanism to cause the connecting means to disconnect the elements after the intermittently rotatable element has moved through only one cycle of movement regardless of the length of time the controlling means is held in position for causing said elements to be connected together.

4. The combination with the crank axle of an implement of a power-lift mechanism having an element normally rotated by a ground wheel on the crank axle, an intermittently rotatable element, a cam disk rotated with said element, a dog normally urged to connect said elements together and having a portion projecting into a notch in said cam disk, a latch normally urged to a position to enter said notch to hold said dog in retracted position, a tripping lever for moving the latch out of the notch to permit the dog to move to connect the elements together, and cam projections carried by said cam disk for disconnecting the tripping lever from the latch after rotation of the intermittently rotatable element has been started to permit said latch to engage the periphery of said cam disk and enter the notch in said disk independently of the tripping lever after the intermittently rotatable element has been rotated through a predetermined cycle.

In testimony whereof, I affix my signature.

HENRY P. CORBIN.